US012735301B2

(12) United States Patent
Faloney, Jr.

(10) Patent No.: US 12,735,301 B2
(45) **Date of Patent: *Sep. 15, 2026**

(54) CRANE WITH SAW ATTACHMENT MECHANISM

(71) Applicant: Fascan International, Inc., Baltimore, MD (US)

(72) Inventor: Bernie James Faloney, Jr., Middle River, MD (US)

(73) Assignee: Fascan International, Inc., Baltimore, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/733,440

(22) Filed: Jun. 4, 2024

(65) Prior Publication Data

US 2024/0317546 A1 Sep. 26, 2024

Related U.S. Application Data

(63) Continuation of application No. 17/323,548, filed on May 18, 2021, now Pat. No. 12,006,187.

(Continued)

(51) Int. Cl.

| | |
|---|---|
| ***B66C 13/00*** | (2006.01) |
| ***B23D 57/00*** | (2006.01) |
| ***B66C 1/34*** | (2006.01) |
| ***B66C 3/04*** | (2006.01) |
| ***B66C 3/20*** | (2006.01) |
| ***B66C 9/00*** | (2006.01) |
| ***B66C 23/00*** | (2006.01) |

(Continued)

(52) U.S. Cl.

CPC .............. *B66C 13/00* (2013.01); *B23D 57/00* (2013.01); *B66C 1/34* (2013.01); *B66C 3/04* (2013.01); *B66C 3/20* (2013.01); *B66C 9/00* (2013.01); *B66C 23/42* (2013.01); *B66C 23/54* (2013.01); *B66C 23/68* (2013.01); *B66C 2700/0371* (2013.01); *B66C 2700/0378* (2013.01)

(58) Field of Classification Search

CPC ......... B66C 23/68; B66C 23/54; B66C 23/42; B66C 9/00; B66C 3/54; B66C 3/20; B66C 3/04; B66C 1/34; B66C 13/00; B23D 57/00

See application file for complete search history.

(56) References Cited

U.S. PATENT DOCUMENTS

| | | |
|---|---|---|
| 12,006,187 B2 | 6/2024 | Faloney, Jr. |
| 2018/0110190 A1 | 4/2018 | Mahrenholz et al. |

(Continued)

*Primary Examiner* — Michael Mccullough
(74) *Attorney, Agent, or Firm* — Nelson Mullins Riley & Scarborough LLP; Anthony A. Laurentano

(57) ABSTRACT

A crawler type crane having a base carrier unit having a control unit associated therewith and an upper portion assembly having a boom portion coupled at end to the base carrier unit and to a jib portion at an opposed end. The boom portion includes one or more selected boom sections that are articulatable relative to each other. The crane also includes a multi-function attachment unit that is coupled to the jib portion and has a grappling unit for grasping a work piece and a saw attachment unit for cutting the workpiece. The crane can also include a first fluid regulating device coupled to the jib portion for regulating a fluid to the jib portion and to the multi-function attachment unit and a second fluid regulating device coupled to the boom portion for regulating a fluid to the winch element and to the multi-function attachment unit.

12 Claims, 7 Drawing Sheets

Related U.S. Application Data

(60) Provisional application No. 63/026,525, filed on May 18, 2020.

(51) Int. Cl.
*B66C 23/42* (2006.01)
*B66C 23/68* (2006.01)

(56) References Cited

U.S. PATENT DOCUMENTS

| | | | |
|---|---|---|---|
| 2020/0198939 | A1 | 6/2020 | Kosaka et al. |
| 2021/0354960 | A1 | 11/2021 | Faloney, Jr. |

CRANE WITH SAW ATTACHMENT MECHANISM

RELATED APPLICATIONS

The present application is a continuation of non-provisional U.S. patent application Ser. No. 17/323,548, filed May 18, 2021, entitled Crane With Saw Attachment Mechanism, which claims priority to provisional patent application Ser. No. 63/026,525, filed on May 18, 2020, and entitled Crane With Saw Attachment Mechanism, the contents of which are herein incorporated by reference.

BACKGROUND OF THE INVENTION

Cranes are well known in the art and have been in use for many years. Cranes are typically used to raise and lower heavy objects, as well as move the objects horizontally. Typical cranes include an outrigger and platform base portion that includes the operator section and is rotatable about the base. The crane can also include a hydraulic or latticed boom portion that can be for example hydraulically moveable in a linear direction (e.g., articulatable). The boom portion can terminate in a jib or uppermost portion that can be coupled to a grappling element, such as a hook. The object to be manipulated is coupled to the hook and the crane moves the object to its desired location.

The conventional cranes can be used in many different types of industries, including for example in the construction industry and in the tree service industry. One specific type of crane suitable for use in the tree industry is a mobile crane. The mobile crane can include a base portion called a carrier and a lifter portion called an upper portion. The upper or lifter portion can include at least a boom portion and if desired a jib portion. The carrier can be mounted on a turntable type component that allows the base portion to rotate thereabout. The conventional jibs are typically coupled to single function devices, such as a grappling hook assembly.

A drawback of the conventional mobile type cranes are that they are large, heavy and are oftentimes difficult to maneuver safely onto a property, especially residential properties. In the case of a tree removal service, it is important that the crane be sized to fit and be maneuverable on the property without damaging the property. Further, typical prior art mobile cranes only employ a grappler hook unit and hence require a tree climber to climb the tree and cut the tree portion for subsequent removal by the crane via the grappler hook.

SUMMARY OF THE INVENTION

The present invention is directed to a crawler type crane system (e.g., articulating boom type cranes) that employs a multi-function attachment unit, such as an attachment unit that includes both a saw attachment and a grappler hook. The crawler type crane is a mobile crane that is sized and configured for use on residential properties since it is easily maneuverable and hence can provide access to hard to reach locations. The crane system also employs a pair of fluid regulating elements, such as diverter valves, where the first diverter valve is fluidly and mechanically coupled to a jib portion and a second diverter valve is fluidly and mechanically coupled to a boom portion. The jib portion can also include an extension component for extending the jib portion of the crane system.

The present invention is directed to a crane system comprising a crawler type crane. The crawler type crane can include a base carrier unit having a control unit associated therewith and an upper portion assembly having a boom portion coupled at end to the base carrier unit and to a jib portion at an opposed end, where the upper portion assembly is rotatably coupled to the base carrier unit so as to move in any selected rotary direction and to be positioned in any selected rotational position. The boom portion includes one or more selected boom sections that are articulatable relative to each other. The crane also includes a multi-function attachment unit that is coupled to the jib portion and has a grappling unit for grasping a work piece and a saw attachment unit for cutting the workpiece. The base carrier portion can include a pair of treads coupled to a main body thereof for moving the crawler type crane.

The crane can also include a single first fluid regulating device coupled to the jib portion for regulating a fluid to the jib portion and to the multi-function attachment unit, a winch element coupled to the boom portion, and a second fluid regulating device coupled to the boom portion for regulating a fluid to the winch element and to the multi-function attachment unit. The control unit is programmed such that the first and second fluid regulating devices regulate fluid to the saw attachment of the multi-function attachment unit.

The jib portion further comprises an angled extension component that is coupled to a distal end of the jib portion and is movable between a stowed position and a deployed position. The angled extension component comprises a first end component that is configured to be coupled to the jib portion and a second integrated end component that is angled relative to the first end component to form an angled section having an angle, wherein the second integrated end component has an interface bracket associated therewith for coupling to the multi-function attachment unit. The angled extension component comprises an internal chamber that mounts a support element for adding support thereto, wherein the support element is disposed in the first integrated end, the second integrated end, and the angled section. The angle is between about 40 degrees and about 50 degrees, and is preferably about 45 degrees.

BRIEF DESCRIPTION OF THE DRAWINGS

These and other features and advantages of the present invention will be more fully understood by reference to the following detailed description in conjunction with the attached drawings in which like reference numerals refer to like elements throughout the different views. The drawings illustrate principals of the invention and, although not to scale, show relative dimensions.

DETAILED DESCRIPTION

Traditionally, the prior art method of removing trees is to have a climber climb or scale the tree, make strategic cuts to the branch or trunk of the tree with a saw (e.g., chain saw), and then have the crane move the cut portion of the tree to a desired location via a grappling hook. However, this is dangerous to the climber, and depending upon the location of the tree, can require operating the crane at or near the operational limits of the crane.

Figure 1:
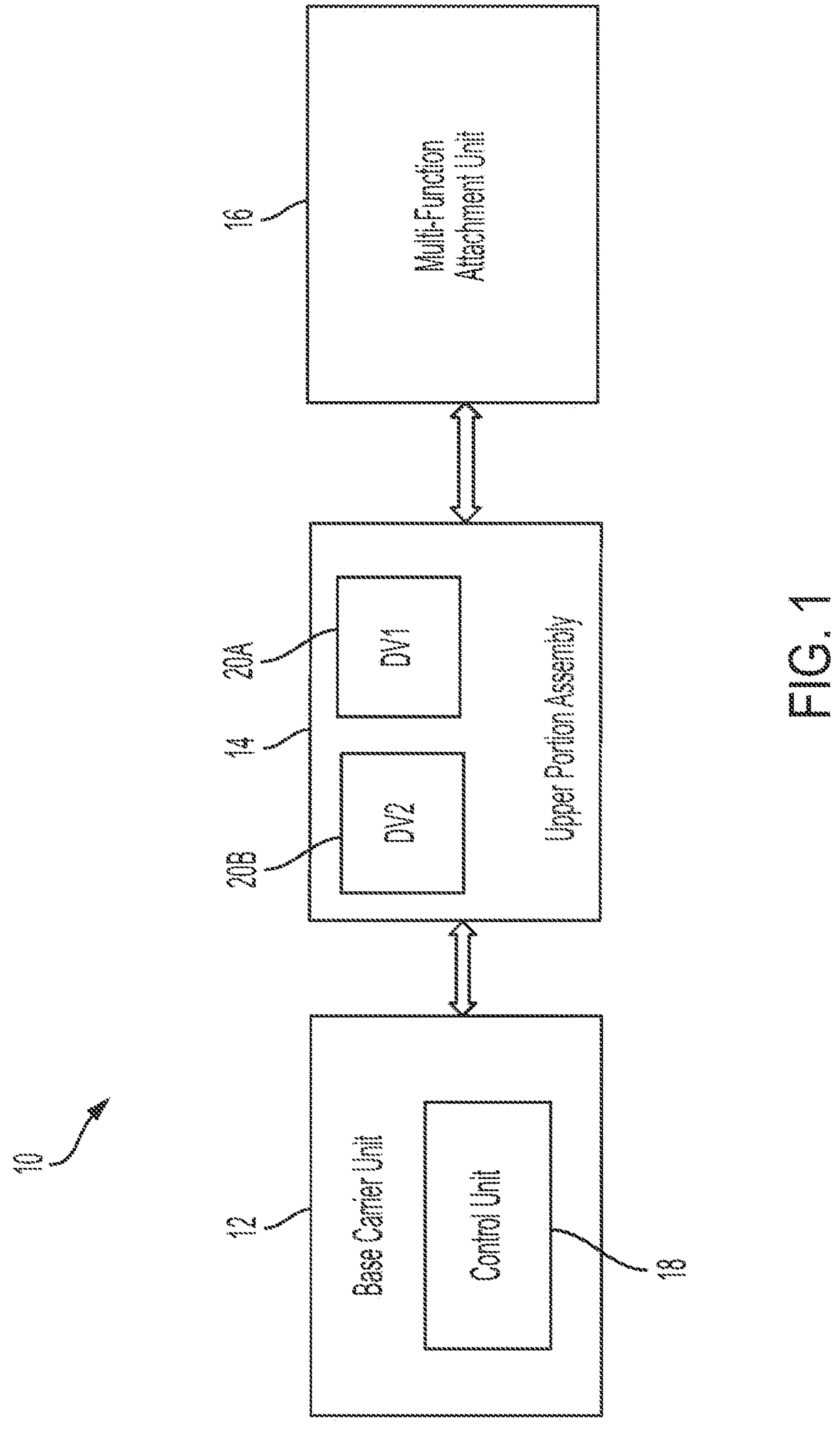
FIG. 1 is a schematic block diagram of a crane system according to the teachings of the present invention.

The present invention is directed to a crane system 10, as schematically shown for example in FIG. 1. The illustrated crane system 10 can include a movable carrier base portion 12 that is coupled to an upper portion assembly 14. In turn, the upper portion assembly can be coupled to a multi-function attachment unit 16 for performing multiple different functions. The upper portion assembly 14 can include multiple fluid regulating devices, including for example a first diverter valve 20A and a second diverter valve 20B. The diverter valves 20A, 20B can be used to control and regulate the hydraulic fluid associated with a specific portion of the crane system. The carrier base portion 12, the upper portion assembly 14, and the multi-function attachment unit 16 can be electrically, mechanically and hydraulically coupled together. The carrier base portion 12 can include a control unit 18 for controlling operation of, separately or in combination, the carrier base unit, the upper portion assembly and the multi-function attachment unit. The crane components can also be controlled by a portable wireless controller (not shown) that communicates with the control unit 18. The portable controller can thus function as an extension of the control unit 18

Figure 2:
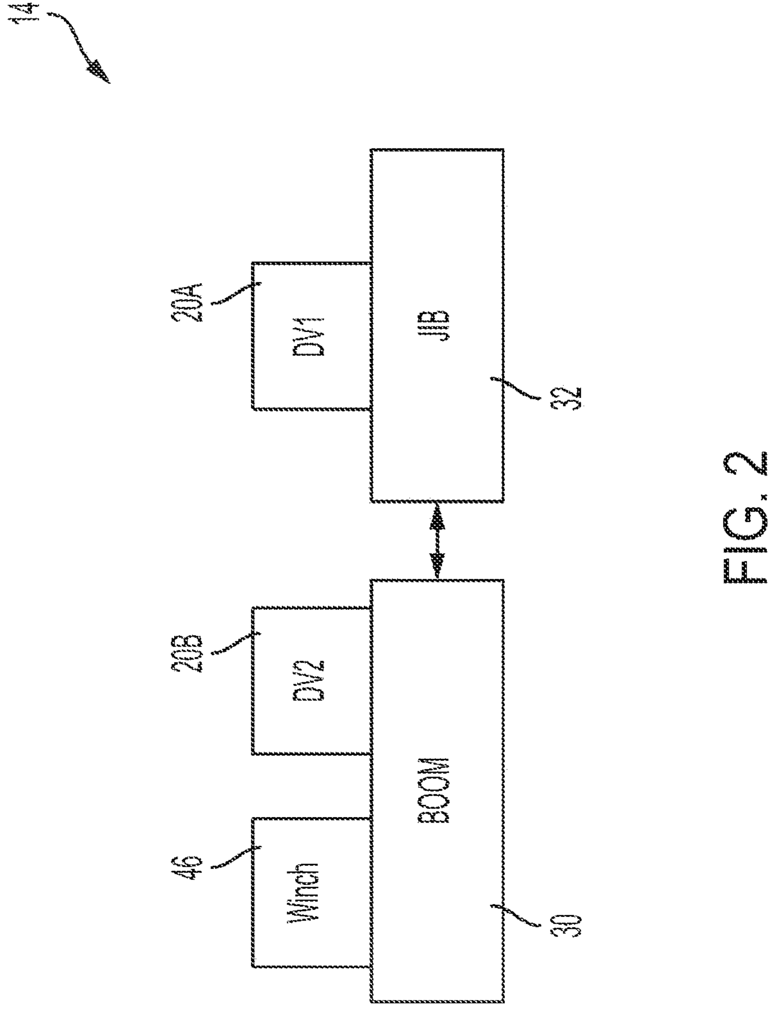
FIG. 2 is a schematic block diagram of the upper portion assembly of the crane system of FIG. 1 according to the teachings of the present invention.
Figure 3:
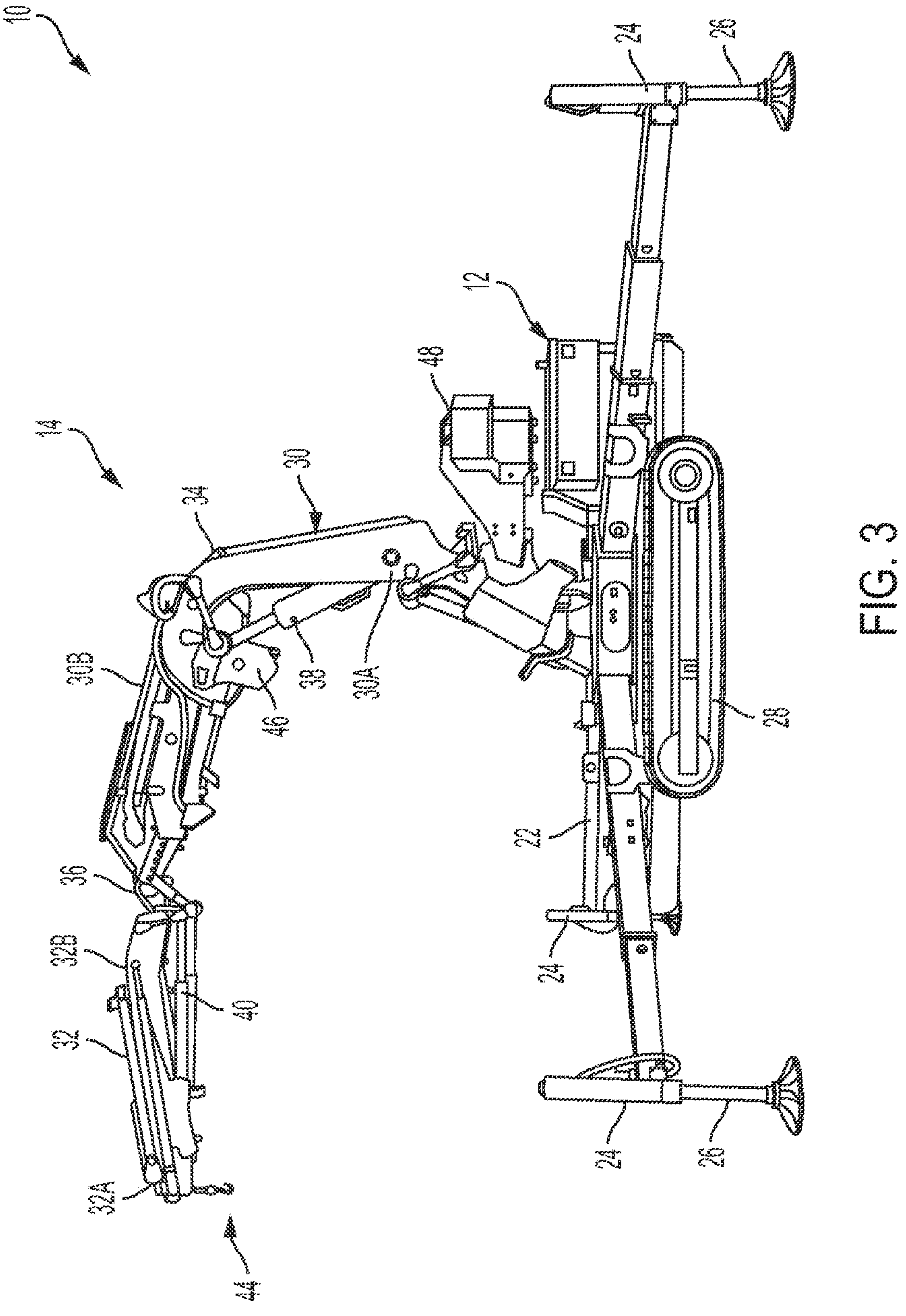
FIG. 3 is a perspective view of the crane system of the present invention.

A specific example of the crane system 10 of the present invention is shown for example in FIGS. 2 and 3. The illustrated crane system 10 can include a crawler type crane that has a base carrier unit 12 that includes a main engine housing 22 that includes a series of stabilizer elements 24 that are movable between a retracted position, where they are positioned along the main housing 22, and a deployed position, as shown. Each of the stabilizer elements 24 can include an adjustable, hydraulic flange element or ram 26 that helps support the main housing 22 when in use. The base carrier unit 12 can also include a pair of opposed tread elements 28 that help propel or move the crane system, as is known in the art. The illustrated upper portion assembly 14 can be rotatably connected to the main housing 22 so as to move in any selected rotary direction and to be positioned in any selected rotational position. The upper portion assembly 14 can include a boom portion 30 that is coupled at one end to the main housing 22 and to a jib portion 32 at an opposed end. The boom portion 30 can have one or more selected sections that are articulatable relative to each other. Further, the boom portion 30 can be extended in a translation or linear direction using known mechanical techniques, such as for example by using a hydraulic assembly. That is, the boom portion 30 can be movable (e.g., multi-positional) in a linear or translational manner to extend and retract the boom sections along the length thereof. Further, the boom portion 30 can have one or more boom sections 30A, 30B that are coupled by a pivot section 34 that allows the boom portion to pivot at selected locations. The boom portions 30A, 30B can be moved at the pivot section 34 by a hydraulic drive element 38. The boom portion 30 can also have a winch element 46 coupled thereto. As is known, the winch element 46 can include a spool of steel cable that is attached to a gear drive unit that is capable of lifting very heavy loads. The winch element 46 can be placed on the boom portion 30, closer to the bottom, and can include enough steel cable to run the length of the boom portion 30 and the jib portion 32 and down to the ground, with extra cable also being wound around the spool. According to one embodiment, the winch element 46 can have an attachment coupled thereto, such as for example a large hook or other type of coupling device, such as for example the multi-function attachment 16, that is attached to an end of the cable that allows the crane to attach to and lift a load. It is common for a crane to have two or more winches, with one winch operating the lift cable while another operates and positions the boom itself. The boom portion 30 can also have a counterweight 48 coupled thereto. The counterweight 48 can include a weight that, by exerting an opposite force, provides balance and stability to the crane. Further, the counterweight 48 can make lifting the load more efficient, which saves energy and is less taxing on the crane components.

Further, the proximal end 32B of the jib portion 32 is coupled to a distal end of the boom portion 30, and specifically as shown to the distal end of the boom portion 30B, via a pivot section 36. Similar to the boom portion 30, the jib portion 32 can be moved at the pivot section 34 by a hydraulic drive element 40. Further, the jib portion 32 can be extended in a translational direction using known mechanical techniques, such as for example by using a hydraulic assembly.

The jib portion 32 has a distal end 32A that is coupled to an attachment unit. Typical attachment units can include a carrier basket, a grappling hook, or a hook element 44 as shown. According to the present invention, the distal end 32A of the jib portion 32 can be coupled to the multi-function attachment unit 16. The multi-function attachment unit 16 can be any suitable mechanical device that provides for multiple different types of functions in a single integrated mechanical unit. The functions can include for example the ability to cut, grab, hoist and the like.

Figure 4A:
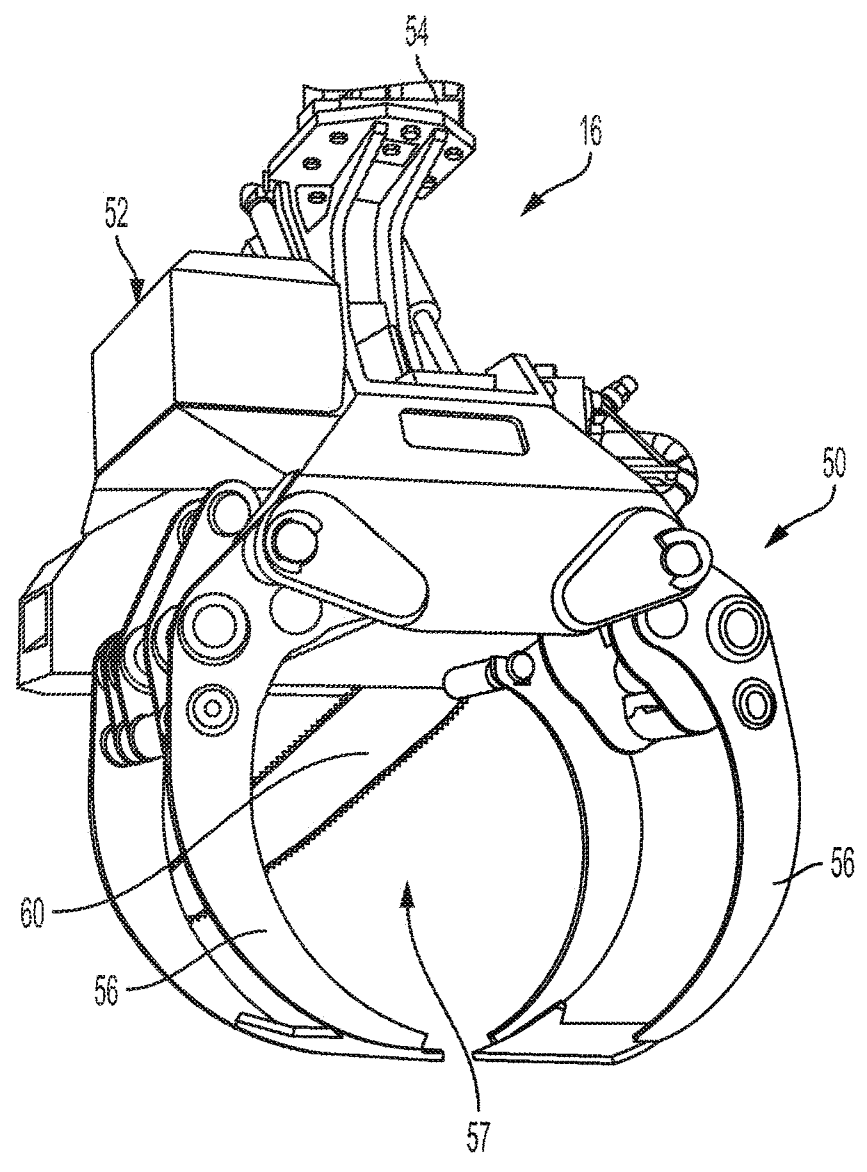
FIG. 4A is a perspective view of the multi-function attachment unit of the crane system of the present invention showing the grasper elements in an open position.
Figure 4B:
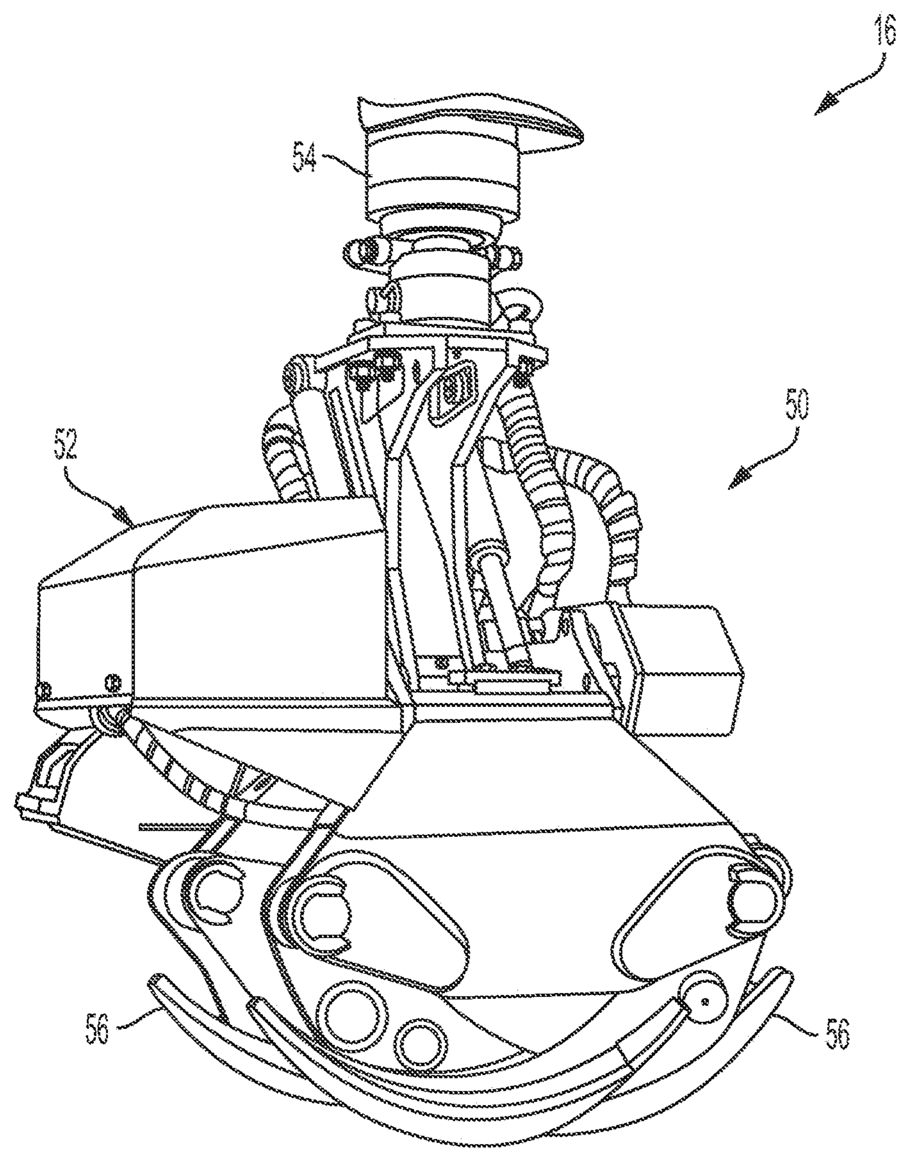
FIG. 4B is a perspective view of the multi-function attachment unit of the crane system of the present invention showing the grasper elements in a closed position.

According to the present invention, the multi-function attachment unit 16 can include an integrated unit 50 that incorporates devices having the ability to simultaneously cut and grasp a workpiece. An example of a suitable integrated unit 50 is shown for example in FIGS. 4A and 4B. The illustrated integrated unit can be coupled to the distal end 32A of the jib portion 32. The integrated unit 50 includes a main housing or body 52 that has a motor unit 54 coupled to a top portion thereof. The integrated unit 50 also includes a grasper attachment that has a pair of grasper elements 56, 56 that are movable relative to each other so as to grasp an object. The integrated unit 50 can further include a cutting attachment, such as a saw attachment 60, for cutting an object. The motor unit 54 can be controlled to operate the grasper attachment and the saw attachment 60. The saw attachment 60 can include a powered saw, such as a chain saw, that is suitable for cutting relatively large objects. The grasper attachment is movable between an open position where the grasper elements 56, 56 are separated from each other to form an opening 57 (FIG. 4A) and a closed position where the grasper elements are nested together (FIG. 4B).

The illustrated crane system 10 can employ two or more fluid regulating devices for regulating a fluid (e.g., a liquid, gas or a combination of both) in one or more of the crane components. According to one embodiment, the present invention employs a single or sole fluid regulating element, such as a diverter valve 20A, on the jib portion 32 of the crane system. This is in contrast to conventional crane systems that employ multiple valves on the jib portion. The diverter valve 20A can be controlled by the control unit 18 to control either rotational movement of the integrated unit 50 or a linear or translational movement (e.g., in and out movement), via an associated motor, of the jib portion 32 along a jib axis. The diverter valve 20A can be a low-flow valve. As used herein, the term "low flow" is intended to mean a flow rate of a fluid, such as hydraulic fluid, through a fluid conduit of less than about 40 L/min. As such, the diverter valve can be controlled to divert fluid to the motor 54 to initially rotate the saw attachment 60 into a proper or desired operating position, and then the diverter valve can be actuated to divert fluid to an extend/retract jib cylinder so as to control movement of the jib portion 32, since the saw attachment typically does not need to be rotated during cutting. The second fluid regulating device, such as diverter valve 20B, can be mounted or located on the boom portion 30 and can also be controlled by the control unit 18. Specifically, the valve 20B can be placed on the boom portion 30 adjacent to the winch element 46. The diverter valve 20B can be actuated by the control unit to divert fluid to the integrated unit 50 so as to operate the integrated unit 50, as needed. Specifically, the second diverter valve 20B can be used to divert fluid to a motor associated with the winch element 46 for operating the winch element or can divert fluid to the motor 54 for operating the saw attachment 60. Once the jib portion 32 is positioned in place, the second diverter valve 20B does not need to divert fluid flow to the winch element 46, and as such diverts hydraulic fluid to the saw attachment for the cutting operation. This split diverter valve configuration hence allows the operator to control operation of the jib up/down function, which is commonly used in conjunction with the saw attachment function. The hydraulic fluid flow paths associated with each diverter valve 20A, 20B can be separate and independent from each other.

Figure 6:
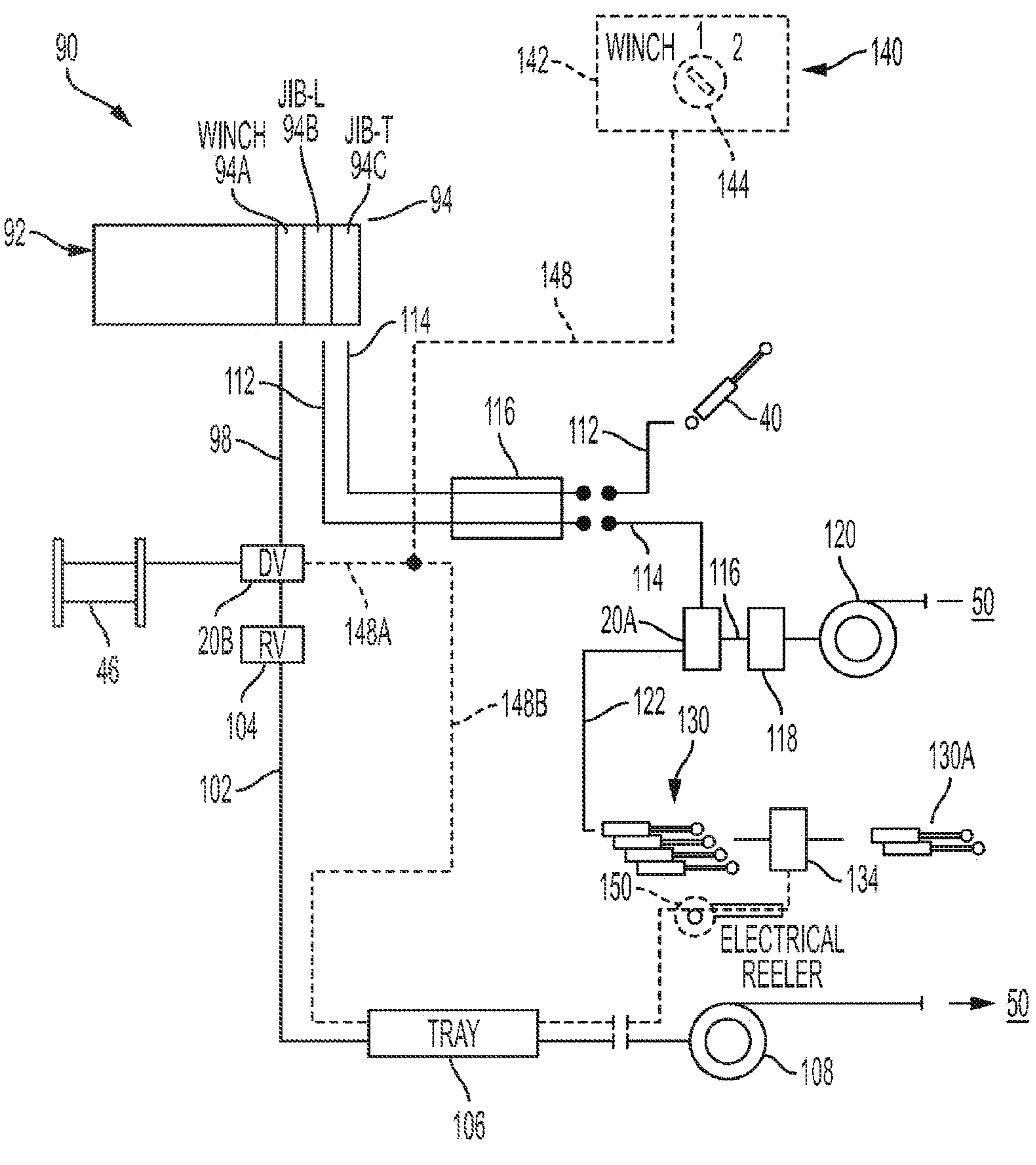
FIG. 6 is a schematic representation of selected portions of the crane system showing the flow path of the hydraulic fluid according to the teachings of the present invention.

FIG. 6 is a schematic representation of an example hydraulic flow path suitable for use with the split diverter valve configuration of the present invention. The illustrated hydraulic subsystem 90 includes a main hydraulic control unit 92 that is configured to communicate with the control unit 18. The hydraulic control unit 92 can include a series of hydraulic controllers 94, such as levers, that are configured for controlling the flow of a hydraulic fluid, such as hydraulic oil, through the flow path associated with the hydraulic subsystem 90. The controllers 94 can include, among other controllers, a winch controller 94A for controlling the flow of hydraulic fluid to the winch element 46, a jib luffing controller 94B for controlling the flow of hydraulic oil to the jib cylinder 40 for moving the jib portion 32 in the up and down direction, and a jib telescoping controller 94C for controlling the telescoping or translational movement of the jib extension components 130 relative to each other and which compose the jib portion 32. For example, the winch controller 94A is coupled to a hydraulic line 98 that communicates with the diverter valve 20B. The winch element 46 also communicates therewith. The diverter valve 20B can be controlled to divert the hydraulic fluid to the winch element 46 if the operator desires to employ or operate the winch. Alternatively, the diverter flow 20B can be actuated to pass the flow of hydraulic fluid to the hydraulic line 102. Specifically, the hydraulic fluid initially can pass through an optional relief valve 104 and then to an options tray 106. The hydraulic fluid is then passed to a spring loaded reeler mechanism 108 that spools and unspools the hydraulic line 102. The hydraulic fluid 102 communicates with the multi-function attachment unit 16, and specifically with motor 54 for providing hydraulic fluid for operating the saw attachment 60.

The jib luffing controller 94B is coupled to the hydraulic line 112 and the jib telescoping controller 94C is coupled to the hydraulic line 114. The hydraulic lines 112, 114 are coupled to the boom trays 116. The purpose of both the boom trays and the option trays is to supply hydraulic and electrical functions to the boom tip and then eventually to the jib. According to one practice, the option trays can be part of the same set of trays as the boom trays 116. According to one embodiment, the boom trays 116 only has enough room for a selected number of hydraulic hoses (e.g., four hoses) so a second set of trays, such as option trays 106, can be employed. The hydraulic line 112 is fluidly coupled to the jib cylinder 40 for moving the jib portion 32 in the up and down directions. The hydraulic line 114 is then coupled to the diverter valve 20A. The diverter valve 20A when actuated by the control unit 18 and the jib telescoping controller 94C can either divert the hydraulic fluid to the hydraulic line 116. The hydraulic fluid in the hydraulic line 116 passes through a relief valve 118 and a spring loaded reeler mechanism 120 to the integrated unit 50. The hydraulic fluid in the hydraulic line 116 allows the operator to rotate the integrated unit 50 into a desired position. The reeler mechanism 120 can spool and unspool the hydraulic line 116 as needed. Alternatively, the diverter valve 20A when actuated by the control unit 18 can divert the hydraulic fluid to a hydraulic line 122 that communicates with the jib extension components 130 of the jib portion 32. The jib portion 32 can include any selected number of telescoping jib extension components 130. As a simple example, the jib portion 32 can include six jib extension components that are telescopically arranged and movable relative to each other. The hydraulic fluid diverted to the hydraulic line 122 allows the operator to actuate one or more of the jib extension components 130. The hydraulic line 122 can also include a limiter valve 134 that limits the hydraulic fluid to a selected number of jib extension components 130. In the illustrated example, the limiter valve 134 limits the flow of hydraulic fluid to a pair of jib extension components 130A. As such, the jib extension components 130A are non-operable.

The illustrated hydraulic subsystem 90 can also be coupled to an electrical subsystem 140 (shown in dashed lines). The electrical subsystem 140 can include a relay box 142 that can have a movable dial component 144 associated therewith for selecting one or more modes of operation. Specifically, the dial component 144 can be moved between a winch mode which, when selected by the operator, passes control signals along electrical pathway 148 to the diverter valve 20B via pathway 148A. The control signals actuate the diverter valve 20B to divert the flow of hydraulic fluid to the winch element 46. The dial element 144 can also be moved to a first jib position and a second jib position for sending control signals along electrical pathways 148 and 148B to the relief valve 134. Although not shown, the electrical subsystem 140 can also communicate with and control the diverter valve 20A. When the dial element 144 is disposed in the first jib position, the relief valve 134 is not actuated and all of the jib extension components 130 are operable. When the dial element 144 is disposed in the second position then the control signals actuate the valve 134 and the jib extension components 130A are rendered inoperative. The electrical subsystem 140 can also include a spring loaded reeler mechanism 150 for spooling and unspooling electrical cable, as is known.

Figure 5A:
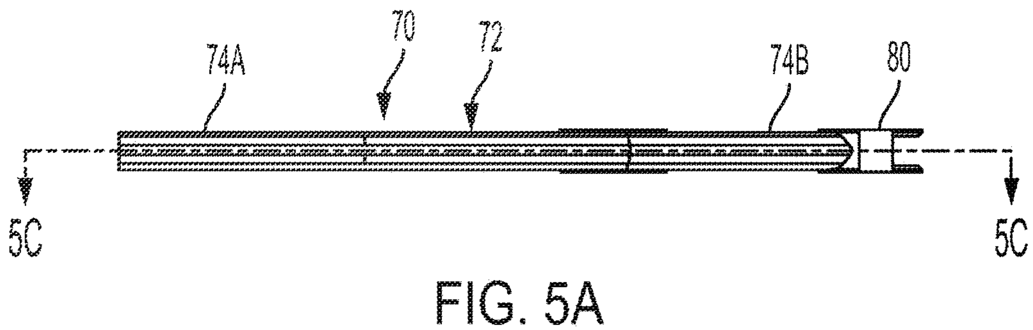
FIG. 5A is a schematic top view of a manual extension component that forms part of the jib portion of the crane system according to the teachings of the present invention.
Figure 5B:
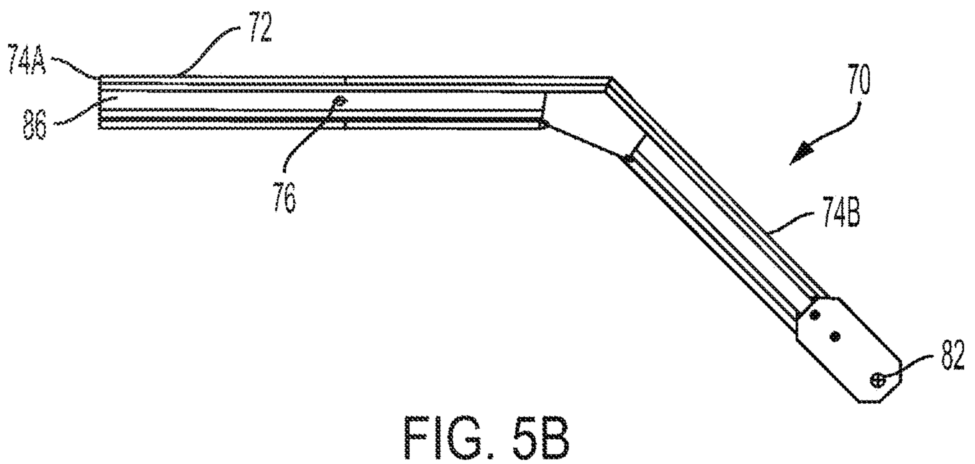
FIG. 5B is a side view of the manual extension component according to the teachings of the present invention.
Figure 5C:
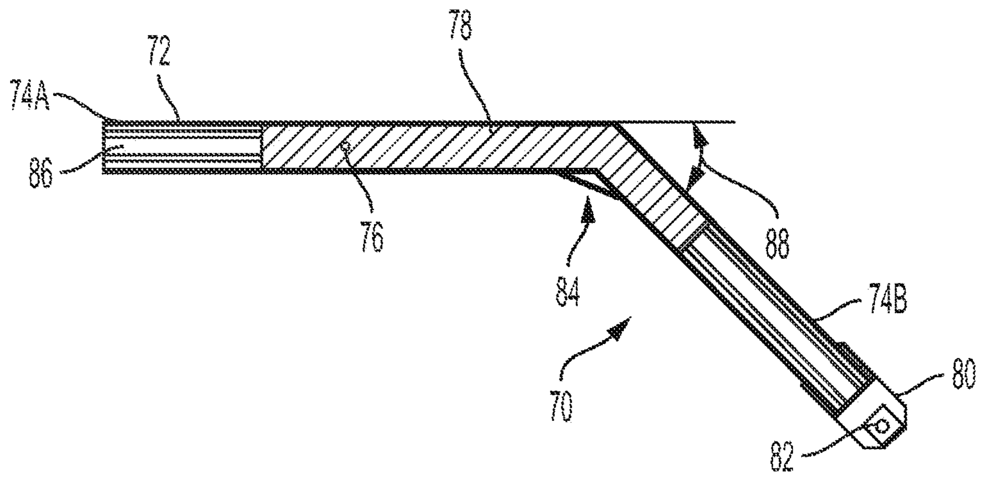
FIG. 5C is a cross-sectional view of the manual extension component of FIG. 5A according to the teachings of the present invention.

As shown in FIGS. 5A-5C, the jib portion 32 can also include an extension component. The illustrated extension component 70 can be manually operable. According to one embodiment, the extension component 70 is a manual extension component that seats within the distal end 32A of the jib portion 32. The extension portion 70 can be manually placed in a deployed or extended position, as needed. The illustrated extension portion 70 has a main body 72 that is generally cylindrical, or diamond shaped and has a proximal end component 74A that can be mechanically coupled to the distal end 32B of the jib portion 32 by a linchpin (not shown) that seats in opening 76. The distal end component 74B of the extension component 70 is angled relative to the proximal end component 74A to form an overall angled extension component. The distal end component 74B terminates in an interface bracket 80 that is coupled to the integrated unit 50. Specifically, the integrated unit 50 can be coupled to the interface bracket 80 via any suitable mechanical connection, such as for example by a post, that seats within the connection aperture 82. The main body 72 of the extension component 70 can form an internal chamber 86 that seats or has mounted therein a structural support element 78. The support element 78 adds strength and rigidity to the angled section 84 formed at the junction or union of the proximal end component 74A and the distal end component 74B. The distal end component 74B can be angled or bent relative to the proximal end component 74A by a selected amount, as indicated by angle 88. The angle 88 can be between about 40 degrees and about 50 degrees, and is preferably about 45 degrees. The structural support element 78 can have any selected shape and is preferably a metal support plate having a selected thickness, such as for example about 0.375 inches.

According to the present invention, one example of a crane system suitable for use in the tree service industry includes a crawler type crane with an articulating boom portion, such as for example the JF545 from Jekko s.r.l. The boom portion of the crane can then be coupled to an integrated unit that includes a saw element, such as for example, to a grapple saw unit. An example of a suitable integrated unit includes for example a grapple saw unit such as those manufactured and sold by Mercanil, Finland. As used herein, the term “crawler type crane” is intended to be directed to a mobile hydraulic crane of selected sizes having an articulating boom as described in ASME B30.22, the contents of which are herein incorporated by reference. The size or dimensions of the crane, or overall footprint, are preferably less than 20 ft long and less than about 7 ft wide. In order to couple a grapple, saw unit to the conventional crawler type crane, the crane mechanics, hydraulics, electronics, and software can be sufficiently modified. The crane system, when coupled with a hydraulic grapple saw unit, can safely maneuver in tight places (e.g., backyards or along a street). This allows the crane system 10 to be positioned closer to for example a tree, thus minimizing the risk or damage or injury to the climber, crane, crane operator, and property.

In operation, the crane system 10 can be moved to a selected location. Once at the location, the crane system via the control unit 18 can deploy the stabilizing elements 24 and the associated hydraulic ram elements 26. The ram elements 26 are moved until they contact a surface, such as the ground, thus stabilizing the entire crane system, as is known in the art. The boom portion 30 of the crane system 10 can then be moved or rotated to a selected position, and the boom element can be extended, if desired, in a translation direction. The boom portion 30 and the jib portion 32 are maneuvered into position, such as for example adjacent a tree or tree limb to be cut. If desired, the manual attachment component 70 can be manually deployed from a retracted position into a deployed position and secured to the distal end 32B of the jib portion 32. The attached integrated unit 50 is coupled to the jib portion 32. The integrated unit 50 can include a grapple saw unit that includes a grapple portion having the grasper elements 56, 56 as well as a saw attachment 60. The control unit 18 can actuate the diverter valve 20A mounted on the jib portion 32 such that hydraulic fluid is conveyed to the motor unit 54 of the integrated unit 50. The motor unit 54 can move or rotate the saw attachment 60 into a proper or selected cutting position. The diverter valve 20A can then be actuated by the control unit 18 to divert fluid flow from the motor unit 54 of the integrated unit 50 to a jib motor for allowing the operator to operate the jib portion 32. The operator can then, if desired, maneuver the jib portion into a selected position. Further, the second diverter valve 20B mounted on the boom portion 30 can be actuated by the control unit 18 to divert fluid flow so as operate the winch element 46 or the saw attachment 60. According to one embodiment, once the integrated unit 50 is attached and maneuvered into a proper position, the winch element need not be employed and as such the diverter valve 30B can divert fluid flow to the integrated unit 50. The grasper elements 56, 56 can be moved into the open position 57 so as to surround the tree limb or tree portion. The grasper elements 56 can then be moved via the control unit 18 into the closed position so as to surround and grasp (e.g., hold) the tree limb. The saw attachment 60 portion of the grapple saw can then be deployed to cut the tree limb in the grasper elements 56. That is, the integrated unit 50 via the motor 54 can operate the saw attachment 60 so as to perform a cutting operation. The cut tree limb can then be maneuvered via a series of coordinated movements of the boom portion 30, the jib portion 32, and the grasper elements 56, to a lowered position so as to place the cut tree limb on the ground.

The control unit 18 can be integrated into the main housing or can be a remote-control unit that can be used by the operator to maneuver the upper portion assembly 14 into a suitable position. Further, the control unit can be configured to control the various portions and functions of the grapple saw unit. Further, the grapple saw unit can have the following hydraulic functions: tilt, movement of the grasper elements, and operation and movement of the saw element.

In the present invention, the grapple saw unit is selectively mated to the crane system 10 by coupling the hydraulics of the grapple saw unit to the hydraulics of the crane element. Further, the grapple saw unit can be electrically connected to the control unit of the crane element, including selected connection and communication between the remote control unit of the grapple saw unit and the control digital interface of the crane element. This requires integration of the software elements for unified control, selected hydraulic couplers and connections between the crane and the grapple saw unit, as well as electrical power connections between the crane and the grapple saw unit. These couplings can be formed into a single interface housing unit for coupling or connecting the components together.

What is claimed is:

1. A crane system, comprising a crawler type crane having a base carrier unit having a control unit associated therewith, an upper portion assembly having a boom portion coupled at one end to the base carrier unit and to a jib portion at an opposed end, the upper portion assembly being rotatably coupled to the base carrier unit so as to move in any selected rotary direction and to be positioned in any selected rotational position, wherein the boom portion includes one or more selected boom sections that are articulatable relative to each other, and a multi-function attachment unit coupled to the jib portion and having a grappling unit for grasping a work piece and a saw attachment unit for cutting the workpiece, wherein the jib portion includes an angled extension component that is coupled to a distal end of the jib portion and is movable between a stowed position and a deployed position, and wherein the angled extension component has an internal chamber that mounts a support element for adding support thereto, wherein the angled extension component includes a first integrated end component that is configured to be coupled to the jib portion and a second integrated end component that is angled relative to the first integrated end component to form an angled section having an angle, wherein the support element is disposed in the first integrated end component, the second integrated end component, and the angled section, and wherein the control unit includes a relay box having a movable dial component selectable among a plurality of operational modes, wherein each mode of the plurality of operational modes is configured to transmit a control signal along a separate electrical pathway to a corresponding valve of the crawler type crane.

2. The crane system of claim 1, wherein the base carrier portion comprises a pair of treads coupled to a main body thereof for moving the crawler type crane.

3. The crane system of claim 2, further comprising a single first fluid regulating device coupled to the jib portion for regulating a fluid to the jib portion and to the multi-function attachment unit.

4. The crane system of claim 3, further comprising a winch element coupled to the boom portion, and a second fluid regulating device coupled to the boom portion for regulating a fluid to the winch element and to the multi-function attachment unit.

5. The crane system of claim 4, wherein the control unit is programmed such that the first and second fluid regulating devices regulate fluid to the saw attachment of the multi-function attachment unit.

6. The crane system of claim 1, wherein the second integrated end component has an interface bracket associated therewith for coupling to the multi-function attachment unit, and wherein the crane system further includes a first fluid regulating device coupled to the jib portion, the first fluid regulating device being a low-flow valve configured to pass hydraulic fluid at a flow rate of less than about 40 liters per minute.

7. The crane system of claim 1, wherein the angle is between 40 degrees and 50 degrees.

8. The crane system of claim 7, wherein the angle is 45 degrees.

9. The crane system of claim 1, wherein the boom portion of the upper portion assembly has a single boom diverter valve and the jib portion of the upper portion assembly has a single jib diverter valve to form a split diverter valve configuration, wherein the boom diverter valve is coupled to the control unit via a first hydraulic pathway and the jib diverter valve is coupled to the control unit via a second hydraulic pathway different than the first hydraulic pathway.

10. The crane system of claim 9, wherein the jib diverter valve is a low-flow diverter valve.

11. The crane system of claim 1, wherein the jib portion includes a plurality of jib extension components, further comprising a jib hydraulic pathway for coupling hydraulic fluid to the plurality of jib extension components, and a limiter valve disposed in the jib hydraulic pathway for limiting the amount of the hydraulic fluid passing to one or more of the plurality of jib extension components.

12. The crane system of claim 1, wherein the jib portion includes a plurality of jib extension components and wherein the plurality of operational modes includes a winch mode, a first jib mode and a second jib mode, wherein:

in the winch mode, the control unit generates a winch control signal to a first diverter valve to divert a flow of hydraulic fluid to a winch element, in the first jib mode, the control unit does not generate a first jib control signal that actuates a limiter valve and the plurality of jib extension components are operable, and in the second jib mode, the control unit generates the first jib control signal that actuates the limiter valve and the plurality of jib extension components are inoperable.

* * * * *